United States Patent Office 3,461,497
Patented Aug. 19, 1969

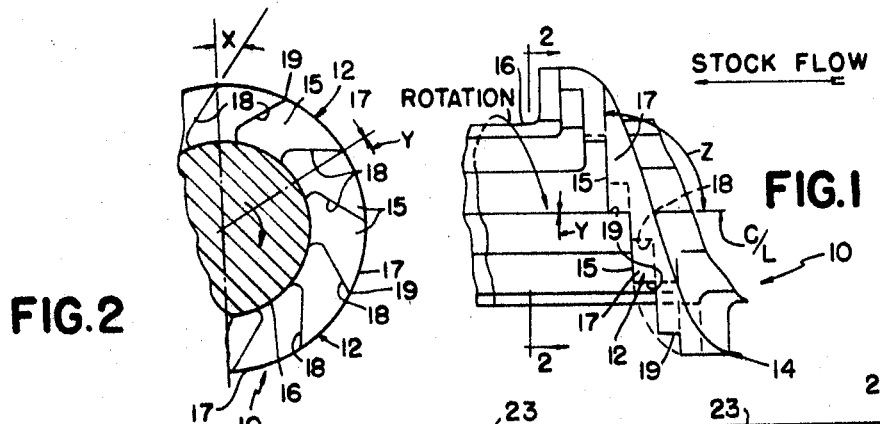
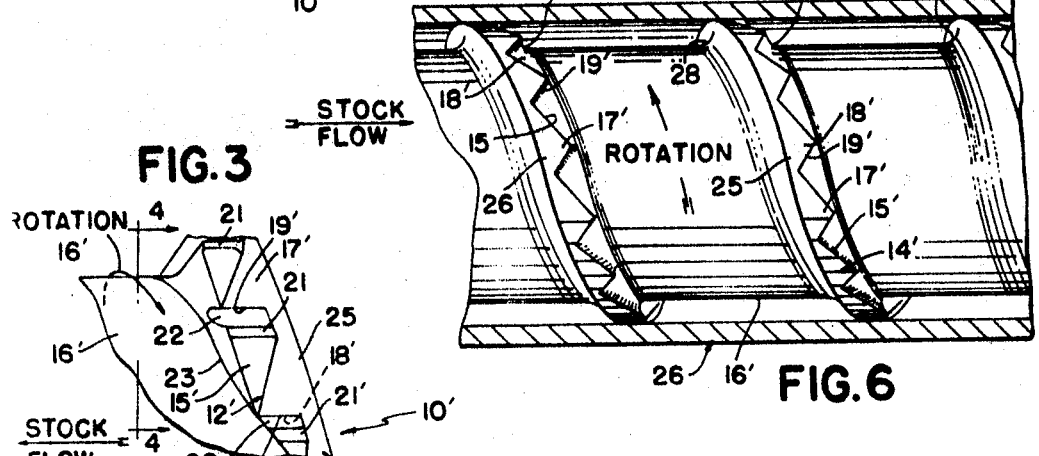
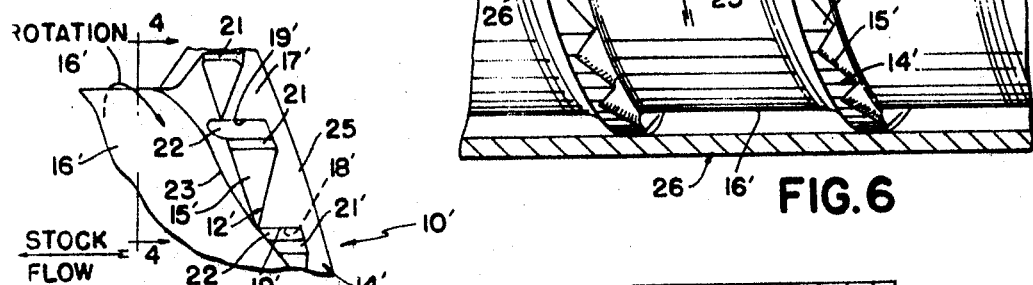
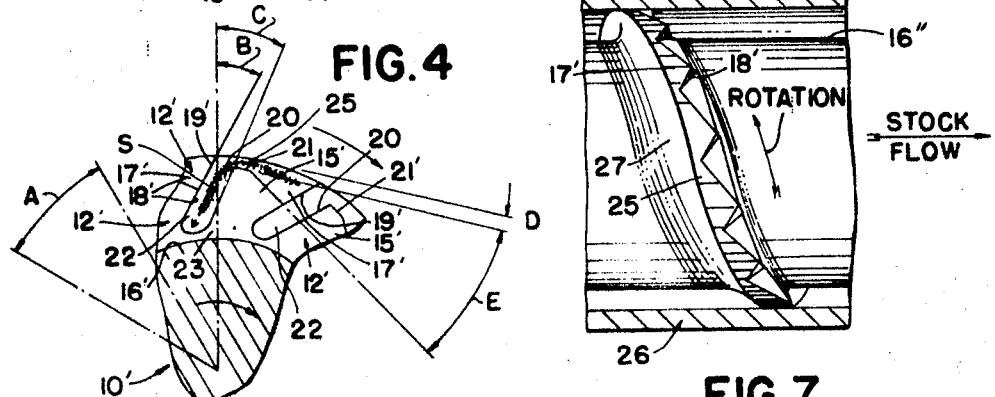
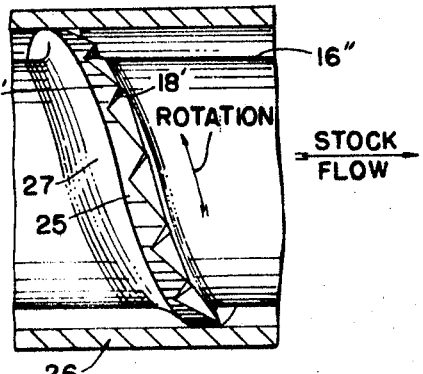
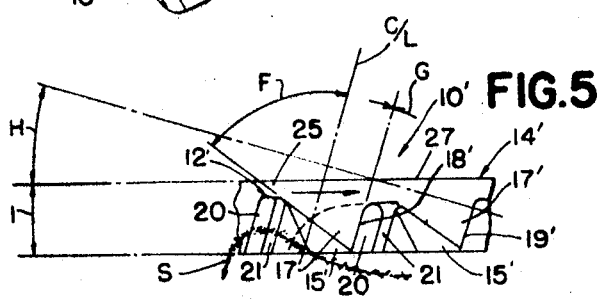

3,461,497
EXTRUSION APPARATUS
James Winston Geyer, 15660 Tacoma,
Detroit, Mich. 48205
Filed Feb. 23, 1967, Ser. No. 617,872
Int. Cl. B29f 3/02
U.S. Cl. 18—12                                    12 Claims

ABSTRACT OF THE DISCLOSURE

Extrusion apparatus in which a screw rotating coaxially in a cylindrical barrel has a helical rib projecting transversely outwardly of the screw axis and coacting with the barrel in treating and advancing material to be extruded axially along the barrel, the rib having a generally saw tooth-shaped surface configuration facing in the direction of advance of the material.

BACKGROUND OF THE INVENTION
Field of the invention

The invention pertains to screw type apparatus or equipment for use in the extrusion of a wide variety of plastic compositions, elastomeric materials, compounds and the like, for example in a mixing, warming and/or melting operation preceding the ultimate extruding step. The invention more particularly relates to a special improvement in the surface configuration of a helical rib formation or formations on an operating screw usually rotating coaxially in a fixed cylinder, into which cylinder material to be treated may be introduced at a hopper zone, upon which the material is conditioned for extrusion by the screw and cylinder, in one or more of the mentioned ways, as the screw advances the material axially along the cylinder. However, the invention is also applicable to extrusion apparatus in which the helical rib formation referred to is provided on the interior of the cylinder, rather than the exterior of the screw, in such manner as to produce flow of material from the hopper zone toward the discharge end of the apparatus. Other variations, hereinafter mentioned, are also possible.

Description of the prior art

In regard to screw type extrusion equipment presently known, such as is exemplified by the patents to Greene, No. 2,732,587 of Jan. 31, 1956, Pumphrey, No. 2,933,762 of Apr. 26, 1960 and Araki, No. 3,184,790 of May 25, 1965, if we consider the peripheral surface portion of the screw between successive helical ribs on the latter to be a groove, the trailing edge or rib portion of the groove has heretofore been constructed as a helix having a smooth surface facing in the axial direction of advance of the stock, whether this surface is truly radial of or is acutely inclined to the screw axis. It has been found that such a smooth surface configuration of the rib (as subjected to high stock pressure due to the friction of the stock against the smooth cylindrical bore of the barrel) is imperfectly adapted to meet the full range of performance requirements arising in a screw type apparatus truly capable of handling the wide range of materials referred to above. This lack of capacity is overcome by the improved saw tooth-like surface configuration of the material mixing and advancing rib (in many different specific available variations of the particular helix configuration); and moreover the mixing, warming and/or melting action of the screw is greatly improved.

SUMMARY OF THE INVENTION

As in prior art equipment of the nature identified above, a simple, uni-wave rolling action is exerted on material in the inter-rib groove, as it adheres to the smooth cylinder or barrel, reaches the trailing edge of the screw's groove and is merged into itself. However, this action is not only amplified by the saw tooth helix, it is also essentially modified in character, in that the teeth constitute, in effect, multiple plows at the trailing groove edge. Instead of forming a smooth single roll at each screw rotation, multiple small rolls of well agitated stock are imposed on and mixed into the basic roll. Since the effective length of the trailing groove edge of the groove is, due to the saw toothed rib configurations, substantially longer than the leading edge or portion of the groove, there results the multiple compounded effect just mentioned.

Bearing in mind the intended wide versatility of the improved equipment in handling or treating many types of stock in a large number of specifically different ways to meet ultimate customer specifications, it is to be understood that the basic saw tooth configuration concept of the invention admits of (indeed, invites) a considerable number of specific variants. Thus, the invention is applicable to apparatus in which the helix (whether on cylinder or screw) is a single lead one, a multiple lead one or a tapered lead one, or in instances where the bottom of the groove between helices is of a cylindrical shape, or is tapered or otherwise contoured in relation to the axis. Likewise, either the screw, the cylinder or barrel, or both may be rotated to obtain the extrusion action. Naturally, to illustrate all these possible variants would needlessly and unduly complicate the drawings, hence only tend to confuse the disclosure. Accordingly, in the present disclosure only a basic saw tooth helix configuration, plus a more sophisticated and practically preferred configuration, are illustrated and described, on the understanding that multiple variations are available as desired or required.

It is also to be understood that, even in the case of any single particular compound requiring treatment, the improved equipment of the invention performs different functions as the stock progresses through its cylinder or barrel. Thus, the stock is compressed and chopped up in a rearward hopper area, causing it to enter and go forward in the barrel. In the main barrel section there may take place de-aeration, blending, intensive dispersion, metering and/or pressure generation, all as called for by the requirements of the user. The end or discharge portion or section usually serves as a pump to raise the pressure on the stock sufficiently to extrude in a desired shape.

It is thus seen to be undesirable to amplify the disclosure in reference to these varied functions by way of disclosure of all of the sections of the equipment. For example, a compounded multiple "tooth-on-tooth" configuration of the rib or helix, essentially pursuant to the basic of the invention, might be called for at one or more sections; and different sizes or types of configuration might be called for in succession along a helix. To attempt to illustrate all the possibilities would be an endless effort, and therefore will not be undertaken.

The foregoing, as well as other objects, will become more apparent as this description proceeds, especially when considered in connection with the accompanying drawings illustrating the invention, wherein:

FIG. 1 is a fragmentary view in side elevation of a basic extrusion screw equipped with a saw tooth helix configuration in accordance with the invention, the directions of rotation of the screw and flow of the stock under treatment being indicated by captioned arrows;

FIG. 2 is a fragmentary view in vertical transverse section along line 2—2 of FIG. 1;

FIG. 3 is a fragmentary side elevational view showing a preferred, more sophisticated and practical version of the basic screw helix or rib configuration of FIGS. 1 and 2;

FIG. 4 is a view in vertical transverse section on line 4—4 of FIG. 3, this view indicating the sinuous direction of flow of treated material in the circumferential sense in relation to plow and shear surface portions of the teeth;

FIG. 5 is a fragmentary development in top plan view of the improved screw, indicating the flow characteristic of the stock in the axial sense;

FIG. 6 is a fragmentary view in cross section through an extruding barrel or cylinder in a plane including the axis thereof, showing one possible variant of the saw tooth surface screw helix, i.e., in a single lead version having an inter-rib groove whose bottom is cylindrical; and FIG. 7 is a view similar to FIG. 6 illustrating an alternative version in which the bottom of the groove is tapered or other than cylindrical.

Reference should first be had to FIGS. 1 and 2 of the drawings, in which the basic and theoretical concept of the invention in regard to a saw tooth-surfaced, axially facing and trailing screw helix is shown. This formation constitutes the rear edge of a cylindrically bottomed groove of the basic extruding screw, which is generally designated by the reference numeral 10. As indicated above, the nature of the configurations appearing in FIGS. 1 and 2 will be considerably altered in any practical embodiment of the invention, some of which are shown in FIGS. 3 through 5, 6 and 7.

Thus, each of a plurality of circumferentially successive tooth formations 12 of a radially projecting rib or helix 14 of screw 10 presents, first, a flat shear surface 15 axially facing and in part defining an inter-rib groove 16 of the screw, second, an outer circumferentially extending and arcuate plow surface 17, and, third, a flat undercut surface 18 facing in the direction of rotation of screw 10, indicated as being clockwise in FIG. 2. Surfaces 17 and 18 intersect at a plow edge 19.

As indicated by the angular dimension X in FIG. 2, front surface 18 has an undercut rake, in relation to a radial plane including its edge 19, to the extent of approximately 30°; although this angle will be varied depending upon the stock and mixing requirements of a given extrusion set-up. As indicated by the dimension Y in FIGS. 1 and 2, the plow edge 19 lies in a radial plane including the axis of screw 10, i.e., is at 0° to the center line of the screw; however, this angle may also be varied, so as to afford a positive or negative rake, to suit specifications as to stock and mixing. Finally, as indicated by the angular dimension Z in FIG. 1, the upright, axially facing shear surface 15 is shown to be at 90° to the center line of screw 10, but, again, this angularity may be, and usually is, varied depending upon the considerations of stock and mixing need.

The above are the basic positional and dimensional relationships of the several successive saw teeth 12 on helical rib 14; and the effect thereof on the mixing action and flow of material under treatment will be understood to be as is detailed in the discussion of a typical preferred embodiment of the screw, per FIGS. 3, 4, and 5. For the sake of simplicity of comparison with the basic structure of FIGS. 1 and 2, features of tooth configuration which in FIGS. 3, 4 and 5 which correspond to those seen in FIGS. 1 and 2 are designated by corresponding reference numerals, primed.

It is to be noted that, in addition to variation in respect to its shear surface 15′, its plow surface 17′ and its undercut surface 18′, each saw tooth member or formation 12′ has a trailing surface 20 at an angle to a radius of screw 10′; and the plow surface 17′ intersects rear surface 20 through a short bridging zone or land 21. Furthermore, the rear surface 20 of each tooth 12′ is circumferentially spaced from the forward surface 18′ of the next tooth by a radially and axially outwardly opening slot 22 of substantial depth, which slot is closed at the rear axial side of helix 14′. The arcuate surface 23 appearing in FIGS. 3 and 4 represents a fillet at which the successive saw tooth or plow members 12′ merge with the bottom of the inter-rib groove 16′. On the basis of the foregoing special surface characteristics of the improved screw 10′, it is in order to proceed with a consideration of a number of dimensions and angular relationships of the saw teeth 12′ which are of an optionally variable nature.

First of all, the angle A appearing in FIG. 4 arbitrarily represents the angular spacing of a given whole tooth 12′, assuming that all thereof are identical (which they need not necessarily be), from the next succeeding tooth. This angle, of course, determines the number of teeth acting upon the stock S to be treated in each rotation of screw 10′. Angle A is variable, and will be determined by the mixing, warming and/or melting requirements for the particular stock under treatment.

Angle B in FIG. 4 (corresponding to the angle Y in FIGS. 1 and 2) represents the angle of undercut or rake of the forwardly facing surface 18′ relative to a radial plane including the axis of screw 10′. The function of the surface 18′, acting in conjunction with the circumferential plow surface 17′, is to plow sheared stock S toward the bottom of the tooth or plow member 12′. Angle B, as indicated above in the discussion of the basic structure of FIGS. 1 and 2, is of the order of 30°, but is variable as also noted previously. It can represent a positive or negative rake.

Angle C (FIG. 4) is the angle of the rear surface 20 of each tooth or plow 12′ relative to a radial plane. Though variable, it is preferably a bit smaller than the circumferential rake angle B.

The dimension D appearing in FIG. 4 represents a slight radial relief of each tooth 12′ in a plane most forward, axial-wise, from its rear maximum radius in an annular zone 25 at which the tooth runs against the interior of the extrusion cylinder (typically designated 26 in FIG. 6). Relief D slants from zone 20 to groove-facing surface 15′ of the tooth, and is determined by the intensity of shear action or mixing which is desired or required.

As shown in FIG. 4, the angle E is the slope of the tooth 12′ along the radially outer edge of its groove-facing shear surface 15′, and along the axially inner edge of its plow surface 17′, where the surface 15′, 17′ intersect. It determines the action of the tooth in compressing and forcing the stock through the clearance space D; and angle E is obviously to be varied in accordance with the characteristics of the stock and the mixing result desired.

The angle F (FIG. 5) is the angle between the base of the shear surface 15′ and the center line of extrusion screw 10′. It is preferably less than 90° but also is variable to satisfy variable extrusion factors.

Angle G, the angle between the front of the plow tooth 12′ and the tip edge 19′ of the tooth is preferably 0° but may be optionally selected to facilitate the self-cleaning of the tooth.

As for the forward surface 18′ of the tooth, it may face and act in a path normal to the center line of screw 10′, or it may have a positive or negative lead angle or rake relative to that path, again depending upon the requirements of the mixing specification. This angle is the angle, designated H (FIG. 5) between the path of action and the plane of advance of the helix 14′, as determined by the plain rear side 27 of tooth 12′. The axial width I of the rib is, of course, also variable.

By preference, the grove 16′ between successive convolutions of rib 14′ is, as shown in an optional embodiment of FIG. 6 (as well as in FIG. 3), cylindrical or flat-bottomed, merging with the convolutions through a fillet 28 on the trailing side of the rib and the aforementioned fillet surface 23 at the leading side of the rib (trailing side of the groove 16′). However, FIG. 7 shows an alternative embodiment, in which the groove, specially designated 16'', has a taper-bottomed or non-cylindrical shape.

FIGS. 6 and 7 also disclose optionally varying angularities of the several surfaces of the saw teeth, as compared with the illustrative embodiment appearing in FIGS. 3, 4 and 5; but since the range of selection in regard to these relationships for any given operation on any given stock is practically endless, further detailed description is not deemed in order.

In action, reference being again had to FIGS. 4 and 5, the stock S flows sinuously in circumferential and axial directions as the screw 10' rotates (FIG. 4) within the barrel or cylinder (not shown) in a relationship to the latter approximating what is depicted in FIGS. 6 and 7. It passes the leading edge 19' of intersection of the respective undercut and plow surfaces 18', 17' of the tooth 15', then between the surface 17' and the inner surface of cylinder 25, being progressively squeezed and compressed as it traverses the reduced width clearance space at surface 21 of the tooth, past which the plow surface intersects the latter's rear surface 20. This flow is in a generally circumferential direction. Stock S at the same time travels in a quasi-radial inward direction, as well as axially (FIG. 5) through the inter-tooth space 22, emerging axially in the form of one of a multitude of small waves or rolls, by which the agitated and plowed sub-wave or sub-roll is re-merged into the main body of the rolling billow of stock S, forwardly of the rib or helix 14'. The shape of the rib or plow on its plain trailing surface, i.e., forwardly of the groove 16', will vary with the use to which the extruder is put; and nothing is specified in this respect.

To illustrate typical instances calling for variation of an angular relationship pursuant to the invention, an intensive mixing operation, such as the dispersing of a powder in a polymer, may require a quite small acute angle B of undercut surface 18' relative to the axis of the cylinder 26, so as to develop intensive pressure on a small portion of the stock. On the other hand, the blending of polymers may require a large angle in relation to the axis, even in excess of 90°, so that large secondary rolls are formed and re-imposed or re-merged with the main roll of the stock. The degree of intensification may also be governed by the nature of the bottom of groove 16', i.e., cylindrical and coaxial with the screw axis or non-cylindrical (FIGS. 6 and 7, respectively); so that it is to be seen that a compounding, of variables may be in order to best suit the saw tooth configured screw for any given extrusion operation.

What is claimed is:

1. Extrusion apparatus comprising a barrel member having a generally cylindrical interior and a generally cylindrical screw member disposed coaxially in said interior, said members being coaxially rotatable relative to one another in the treating and axial advancing of material to be extruded within and along said barrel member, one of said members being provided with at least one rib formation projecting generally radially for coaction with the other member in the advance of the material, said rib formation having a generally saw tooth-shaped surface configuration facing axially thereof in the direction of said material advance.

2. Extrusion apparatus comprising a barrel having a generally cylindrical interior and a generally cylindrical screw disposed coaxially in said interior and rotating therein in the treating and axial advancing of material to be extruded within and along said barrel, said screw being provided with at least one generally helically disposed rib formation projecting generally radially outwardly for coaction with said interior of said barrel in the advance of the material, said rib formation encircling the screw and having a generally saw tooth-shaped surface configuration facing axially thereof in the direction of said material advance and extending only partially through the thickness of the rib formation.

3. Extrusion apparatus comprising a barrel having a generally cylindrical interior and a generally cylindrical screw disposed coaxially in said interior and rotating therein in the treating and axial advancing of material to be extruded within and along said barrel, said screw being provided with at least one generally helically disposed rib formation projecting generally radially outwardly for coaction with said interior of said barrel in the advance of the material, said rib formation encircling the screw and having a generally saw-tooth shaped surface configuration facing axially thereof in the direction of said material advance, said rib formation being given said saw-tooth shaped configuration by means of circumferentially spaced teeth each having a surface facing the direction of rotation of the screw, a shear surface facing in the direction of advance of the material in the barrel, and a generally circumferentially extending plow surface disposed radially outwardly of said first named and shear surfaces, said three surfaces coacting in the agitative rolling of small portions of a main roll of the advancing material and the re-merging of said portions into said main roll for continued advance therewith.

4. The apparatus of claim 3, in which said teeth are undercut rearwardly of said direction of rotation of the screw.

5. The apparatus of claim 4, in which said plow surface intersects both said first named and shear surfaces.

6. The apparatus of claim 5, in which said teeth are undercut rearwardly of said directions of rotation of the screw.

7. The apparatus of claim 4, in which the undercut of said first named surface is of the order of 30°.

8. The apparatus of claim 4, in which said plow surface inclines axially and radially inwardly of the screw axis and in the direction of advance of the material.

9. The apparatus of claim 4, in which said shear surface is an angle other than 90° to a plane normal to the screw axis.

10. The apparatus of claim 4, in which the undercut of said first named surface is of the order of 30°, said plow surface being inclined axially and radially inwardly of the screw axis and in the direction of advance of the material, said shear surface being an angle other than 90° to a plane normal to the screw axis.

11. The apparatus of claim 3, in which said tooth surfaces are shaped to occasion a sinuous flow of treated material in circumferential and axial directions between the plow surface thereof and the barrel, radially into the space between successive teeth and axially out of that space into an annular zone forward of the rib formation.

12. The apparatus of claim 4, in which said tooth surfaces are shaped to occasion a sinuous flow of treated material in circumferential and axial directions between the plow surface thereof and the barrel, radially into the space between successive teeth and axially out of that space into an annular zone forward of the rib formation.

References Cited

UNITED STATES PATENTS

| 2,473,230 | 6/1949 | Van Riper | 18—12 |
| 3,211,209 | 10/1965 | Latinen | 18—12 |

FOREIGN PATENTS

| 76,225 | 9/54 | Netherlands. |

WILLIAM J. STEPHENSON, Primary Examiner